(12) United States Patent
Lee

(10) Patent No.: US 6,713,936 B2
(45) Date of Patent: Mar. 30, 2004

(54) STEPPING MOTOR

(75) Inventor: In Ho Lee, Suwon-Shi (KR)

(73) Assignee: Samsung Electro-Mechanics, Co., Ltd., Kyungki-Do (KR)

( * ) Notice: Subject to any disclaimer, the term of this patent is extended or adjusted under 35 U.S.C. 154(b) by 4 days.

(21) Appl. No.: 10/107,869

(22) Filed: Mar. 26, 2002

(65) Prior Publication Data

US 2003/0102726 A1 Jun. 5, 2003

(30) Foreign Application Priority Data

Dec. 3, 2001 (KR) .......................... 2001-75969

(51) Int. Cl.⁷ .......................... H02K 21/12; H02K 1/12
(52) U.S. Cl. ................ 310/257; 310/49 R; 310/156.25; 310/254
(58) Field of Search ................ 310/49 R, 254, 310/257, 156.25

(56) References Cited

U.S. PATENT DOCUMENTS

| | | | | |
|---|---|---|---|---|
| 3,403,273 A | * | 9/1968 | Higuchi | 310/257 |
| 5,121,017 A | * | 6/1992 | Yamamoto et al. | 310/49 R |
| 5,747,897 A | * | 5/1998 | Iwasa et al. | 310/49 R |
| 5,811,903 A | * | 9/1998 | Ueno et al. | 310/90 |
| 6,153,953 A | * | 11/2000 | Isozaki et al. | 310/49 R |
| 6,208,046 B1 | * | 3/2001 | Lee | 310/49 R |
| 6,211,585 B1 | * | 4/2001 | Sato et al. | 310/49 R |
| 6,222,287 B1 | * | 4/2001 | Suzuki | 310/49 R |
| 6,255,749 B1 | * | 7/2001 | Aoshima et al. | 310/49 R |
| 6,259,176 B1 | * | 7/2001 | Isozaki et al. | 310/49 R |
| 6,316,851 B1 | * | 11/2001 | Maegawa et al. | 310/49 R |

* cited by examiner

Primary Examiner—Nestor Ramirez
Assistant Examiner—J. Aguirrechea
(74) Attorney, Agent, or Firm—Darby & Darby P.C.

(57) ABSTRACT

The present invention relates to a stepping motor. The stepping motor includes a rotor having a cylindrical magnet with a plurality of N-S poles being radially magnetized thereto and a shaft having one end coupled to the center of the magnet and rotationally supported by bearings; at least one coil wound into the shape of a ring at axial sides of the magnet with air gaps; and a stator shaped as a cylinder with a shaft hole in the center for receiving the coil, the stator having an outer yoke which is arranged concentric with the magnet and has an outer circumferential edge extendedly branched at the same interval to form first pole teeth which are opposedly arranged on the outer circumferential face of the magnet with an air gap therefrom, and an inner yoke with one end of smaller diameter being inserted into the inner circumferential face of the coil and the other end of larger diameter extendedly branched while covering the side of the coil to form second pole teeth which are alternately arranged with the first pole teeth.

9 Claims, 5 Drawing Sheets

STEPPING MOTOR

BACKGROUND OF THE INVENTION

1. Field of the Invention

The present invention relates to a stepping motor for performing rotational movement corresponding to pulse power, in particular, in which a magnet and yokes are axially arranged and one ends of the yokes are so provided to surround a portion of the magnet, thereby enabling downsizing of the stepping motor while ensuring stable driving characteristics thereof.

2. Description of the Related Art

In general, a stepping motor maintains a very large static torque in the stopped position compared to other motors while being rotated at a given angle without feedback for detecting the position of a shaft and stopping at a considerably high precision rate. Therefore, the stepping motor does not require a separate position-maintaining mechanism such as electromagnetic brake and the rotation speed thereof is proportional to pulse rate, and thus the stepping motor has a driving characteristic that it can be readily controlled.

Due to such characteristics, the stepping motor is generally used in operations for precisely controlling mechanical movement, and in particular, widely used as a driving source of since it can be controlled digitally via pulse.

For example, the stepping motor is used as a driving source for controlling the printing position of a print head, the pen position of an X-Y plotter or the head position of a floppy disk and various disk ROMs. Also, the stepping motor is used for precision control of various electronic instruments such as paper money counter, sewing machine, electric typewriter and facsimile.

FIG. 1 is a schematic sectional view showing a stepping motor of the prior art, and FIG. 2 is a perspective view showing the stepping motor of the prior art. As shown in the drawings, the stepping motor is mainly comprised of a rotor and a stator.

The rotor is constituted of a shaft s and a magnet m. The shaft s functioning as an output end having a predetermined length is inserted into bearings b coupled in central planes of the first and second cover plates c1 and c2 to be supported rotationally in a forward or reverse direction. In the outer circumferential face of one end of the shaft s, is provided the magnet m substantially shaped as a cylinder, which has a configuration that N and S poles are alternately magnetized in the outer circumferential face.

Meanwhile, the magnet m is arranged opposite to the following coils 130 and 230 in the inner circumferential face of the stator with a predetermined air gap therefrom to generate a predetermined amount of electromagnetic force through the interaction.

The stator is mainly comprised of the first and second stators 100 and 200 in the shape of a cylinder. The stators 100 and 200 are arranged and coupled colinear, and provided in the inner faces with the first and second yokes 110 and 210 around which the coils 130 and 230 are wound.

In particular, the first yoke 110 has an inside bobbin 120 and the coil 130 wound around the outer face of the bobbin 120. In the inner face of the rotor opposed to the magnet m, the yoke is alternately arranged to have a shape of tooth-type engagement.

The second yoke 210, as the first yoke 110, is provided in the inner face with a bobbin 220 around which the coil 230 is wound. In the inner face of the foregoing rotor opposed to the magnet m, the yoke is alternately arranged to have a shape of tooth-type engagement.

Meanwhile, the first and second stators 100 and 200, when seen from the drawings, are so configured that the right and left faces are integrally fixed by the first and second cover plates c1 and c2 interposing bearings in the central face for rotationally supporting the shaft s.

In the conventional stepping motor having the configuration as set forth above, when both of the coils 130 and 230 of the first and second stators 100 and 200 are externally applied with current, the coils 130 and 230, the first and second yokes 110 and 210 and the magnetic poles of the magnet m undergo interaction to generate electromagnetic force, thereby causing the rotor having the magnet m and the shaft s to rotate about the first and second stators 100 and 200.

Lately, as the precision instruments are downsized and thin-shaped, the stepping motor mounted to the precision instruments is also required to be slimmed. However, the conventional stepping motor comprises a number of components having diameters different from each other in the outer circumferential face about the shaft s, thereby restricting downsizing.

For example, there is a method for downsizing the conventional stepping motor by reducing the diameters of the magnet m and the coils 130 and 230. In this configuration, however, electromagnetic force of the magnet m and the coils 130 and 230 are lowered also, thereby lowering mutual electromagnetic force by a large margin. Therefore, as the motor is downsized, the output capacity is also lowered thereby restricting downsizing.

SUMMARY OF THE INVENTION

The present invention has been devised to solve the foregoing problems and it is therefore an object of the invention to provide a stepping motor in which a magnet and yokes are axially arranged and one end of the yokes is provided to surround a portion of the magnet, thereby enabling downsizing of the stepping motor while ensuring driving characteristics thereof.

In accordance with an aspect of the invention to obtain the foregoing object, a stepping motor comprises: a rotor having a cylindrical magnet with a plurality of N-S poles being radially magnetized thereto and a shaft having one end coupled to the center of the magnet and rotationally supported by bearings; at least one coil wound into the shape of a ring at axial sides of the magnet with air gaps; and a stator shaped as a cylinder with a shaft hole in the center for receiving the coil, the stator having an outer yoke which is arranged concentric with the magnet and has an outer circumferential edge extendedly branched at the same interval to form first pole teeth which are opposedly arranged on the outer circumferential face of the magnet with an air gap therefrom, and an inner yoke with one end of smaller diameter being inserted into the inner circumferential face of the coil and the other end of larger diameter extendedly branched while covering the side of the coil to form second pole teeth which are alternately arranged with the first pole teeth.

Preferably, the yoke comprises first and second yokes provided at both axial sides of the magnet.

Preferably, the first and second pole teeth are energized into the polarities different from each other according to the direction of current applied to the coil.

Preferably, the pole teeth of the first yoke and the pole teeth of second yoke are extended toward each other.

Also, preferably, each of the first and second yokes is fixedly inserted into the inner circumferential face of a cylindrical housing.

Preferably, the first and second pole teeth have a proper air gap from each other.

In accordance with another aspect of the invention to obtain the foregoing object, a stepping motor comprises: a cylindrical magnet with a plurality of N-S poles being radially magnetized thereto; a shaft having one end coupled to the center of the magnet and rotationally supported by bearings; a pair of coils wound into the shape of a ring at axial sides of the magnet with air gaps; first and second yokes having an outer yoke shaped as a cylinder for receiving the coils which is arranged concentric with the magnet and has an outer circumferential edge extendedly branched at the same interval to form first pole teeth which are opposedly arranged on the outer circumferential face of the magnet with an air gap therefrom, and an inner yoke with one end of smaller diameter being inserted into the inner circumferential face of the coil and the other end of larger diameter extendedly branched while covering the side of the coil to form second pole teeth which are alternately arranged with the first pole teeth; and a housing for fixedly receiving the outer circumferential edges of the first and second yokes.

Preferably, the first and second pole teeth are energized into the polarities different from each other according to the direction of current applied to the coil.

Also, preferably, the first and second pole teeth have a proper air gap from each other.

DETAILED DESCRIPTION OF THE PREFERRED EMBODIMENT

The following detailed description will present a preferred embodiment of the invention in reference to the accompanying drawings.

Figure 1:
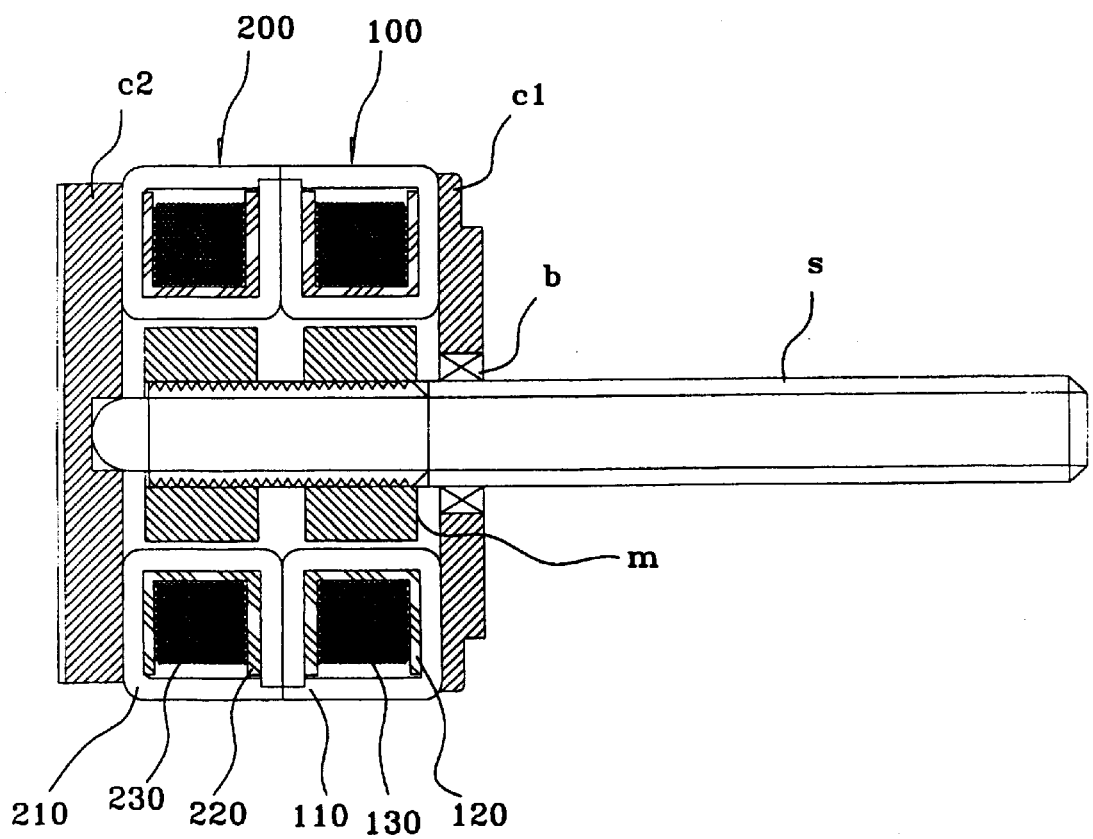
FIG. 1 is a schematic sectional view showing a stepping motor of the prior art.
Figure 2:
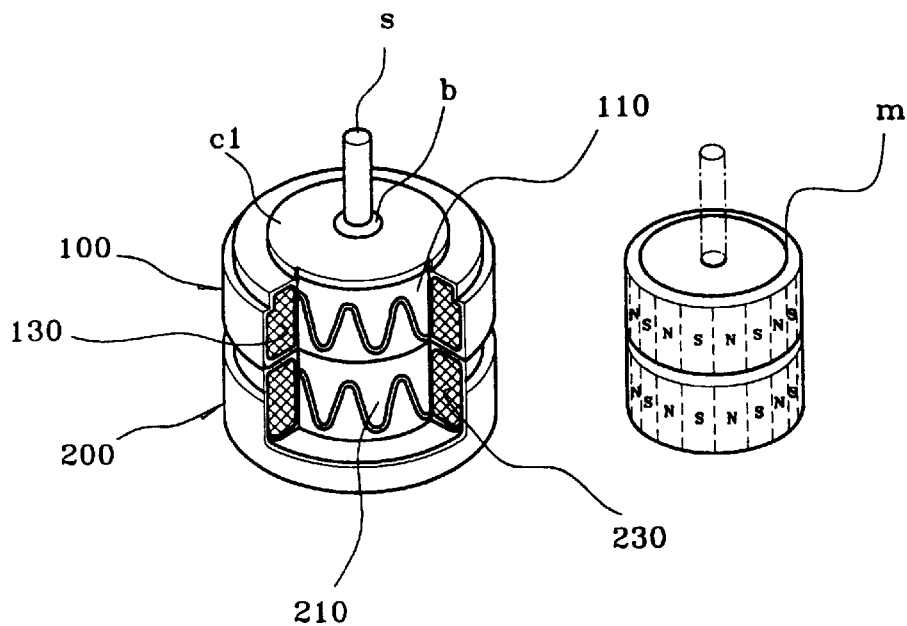
FIG. 2 is a perspective view showing a stepping motor of the prior art.
Figure 3:
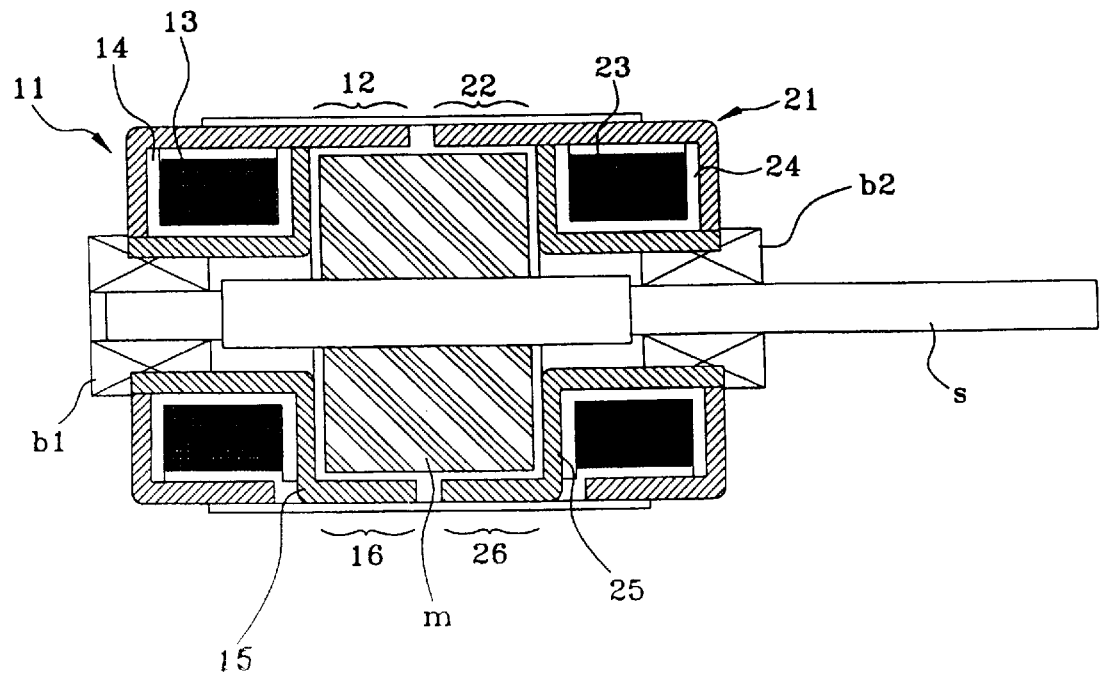
FIG. 3 is a schematic sectional view showing a stepping motor of the invention.
Figure 4:
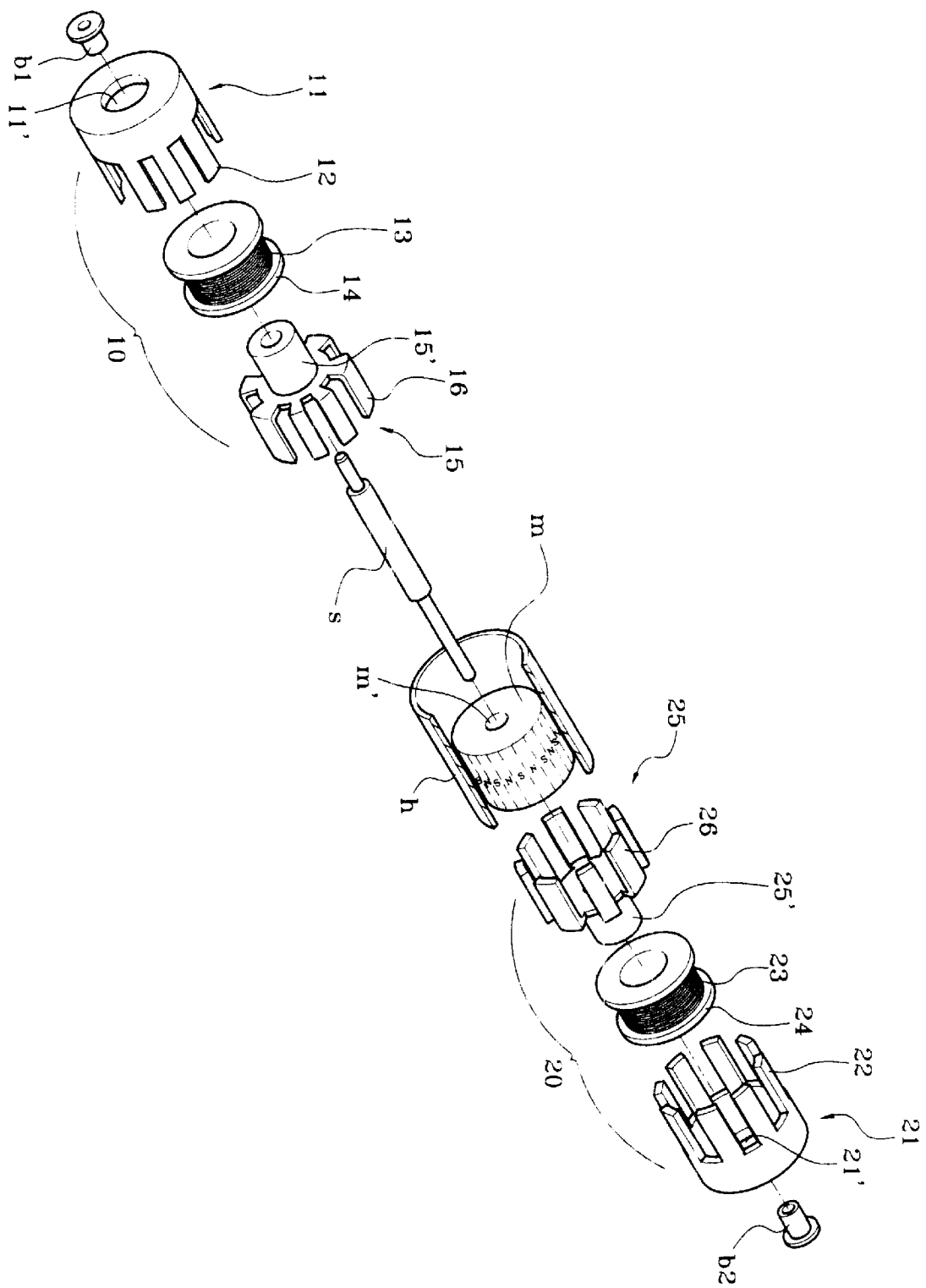
FIG. 4 is an exploded perspective view showing a stepping motor of the invention.

FIG. 3 is a schematic sectional view showing a stepping motor of the invention, and FIG. 4 is an exploded perspective view showing a stepping motor of the invention.

As shown in FIGS. 3 and 4, the stepping motor is mainly comprised of a rotor for driving rotation and a stator for maintaining a fixed state.

The rotor, as substantial output means for implementing rotational motion about the stator, is mainly constituted of a shaft s and a magnet m.

The shaft s, when seen from the drawings, has a structure with one end inserted into the center of the stator and axially supported by a plurality of bearings b1 and b2 to be rotated in a forward/reverse direction. In the outer circumference of the shaft s, is provided the magnet m having magnetized N or S poles.

The magnet m has a substantially cylindrical shape, and provided with a shaft hole m1 in the center into which the shaft s can be axially inserted. The magnet m is so constituted that a plurality of N and S poles are alternately magnetized in the circumference, and generates electromagnetic force through the interaction with the following yokes.

The stator is generally constituted of yokes, which are energized into the N or S poles, ring-shaped coils respectively wound in the inner faces of the yokes and cylindrical bobbins with the outer circumferences around which the coils are respectively wound.

The yokes are divided into the first yoke 10 and the second yoke 20, which are so provided to oppose each other as interposing the magnet m therebetween. As shown in FIG. 3, the first yoke 10 is positioned in the axially left of the magnet m, and the second yoke 20 is positioned in the right of the magnet m. The first yoke 10 and the second yoke 20 are arranged concentric with the magnet m while forming air gaps therewith. In the inner faces of the yokes 10 and 20 are respectively provided with bobbins 14 and 24 around which coils 13 and 23 are wound.

The first yoke 10 is constituted of the outer yoke 11 and the inner yoke 15. The outer yoke 11 is so constituted that a cylindrical shape with a hole 11' is provided in the center with a given size. In the inner face of the yoke 11 is provided with the cylindrical bobbin 14 around which the coil 13 is wound. The outer yoke 11 is arranged concentric with the magnet m, and has an outer circumferential edge, which is extendedly branched, at the same interval to form a plurality of first pole teeth 12 which are opposedly arranged on the outer circumferential face of the magnet m with an air gap therefrom. The first pole teeth 12 are magnetized into the N or S poles according to the direction of current applied to the coil 13 to generate electromagnetic force through the interaction with the magnet m.

The inner yoke 15 has an inserting portion 15' with a shaft hole (not shown) which has a diameter larger than the diameter of the shaft s. The inserting portion 15' is inserted into the hole 11' of the outer yoke 11 via the inner circumferential face of the bobbin 14 as show in the drawings. The inserting portion 15' has an increased diameter at one end to cover one side of the core 13 in cooperation with the outer yoke 11, and the outer circumferential edge thereof forms a plurality of second pole teeth 16 which are alternately arranged with the first pole teeth 12.

The first pole teeth 12 and the second pole teeth 16 form a predetermined air gap therebetween, and are energized into the polarities different from each other according to the direction of current applied to the coil 13. In particular, when the first pole teeth 12 are energized into the N poles, the second pole teeth 16 are energized into the S poles. On the contrary, when the first pole teeth 12 is energized into the S poles, the second pole teeth 16 is energized into the N poles.

The second yoke 20 has the same structure as the foregoing first yoke 10, and is opposed to the first yoke 10 about the magnet m. In particular, the second yoke 20 is mainly constituted of the outer yoke 21 and the inner yoke 25. The inner yoke 25 is cylindrically shaped with a given size of hole 21' in the center, and in the inside thereof is provided a bobbin 24 around which a coil is wound. The outer yoke 21 is arranged concentric with the magnet m, and has an outer circumferential edge which is extendedly branched at the same interval to form a plurality of first pole teeth 22. The first pole teeth 22 are opposed to one another while forming the air gaps on the outer circumferential face of the magnet m. The first pole teeth 22 are extended toward the first pole teeth 12 of the first yoke 10, and selectively magnetized into the N or S poles according to the direction of current applied to the coil 13 to generate electromagnetic force through the interaction with the magnet m.

Meanwhile, the inner yoke 25 of the second yoke 20 has a cylindrical insertion portion 25' inserted into the hole 21' of the outer yoke 21. The insertion portion 25 has a portion increased in diameter while being branched extendedly at the same interval to form the second pole teeth 26. The second pole teeth 26 are alternately arranged with the first pole teeth 22 of the outer yoke 21, and selectively energized into the S or N poles according to the direction of current applied to the coil 23.

Meanwhile, the unexplained reference numerals b1 and b2 designate bearings which are respectively inserted into the central planes of the first yoke 10 and the second yoke 20 to rotationally support the shaft s. The reference numeral h is a cylindrical housing which receives the outer circumferential edges of the first and second yokes 10 and 20.

The operations of the stepping motor configured as set forth above will be described below.

Figure 5:
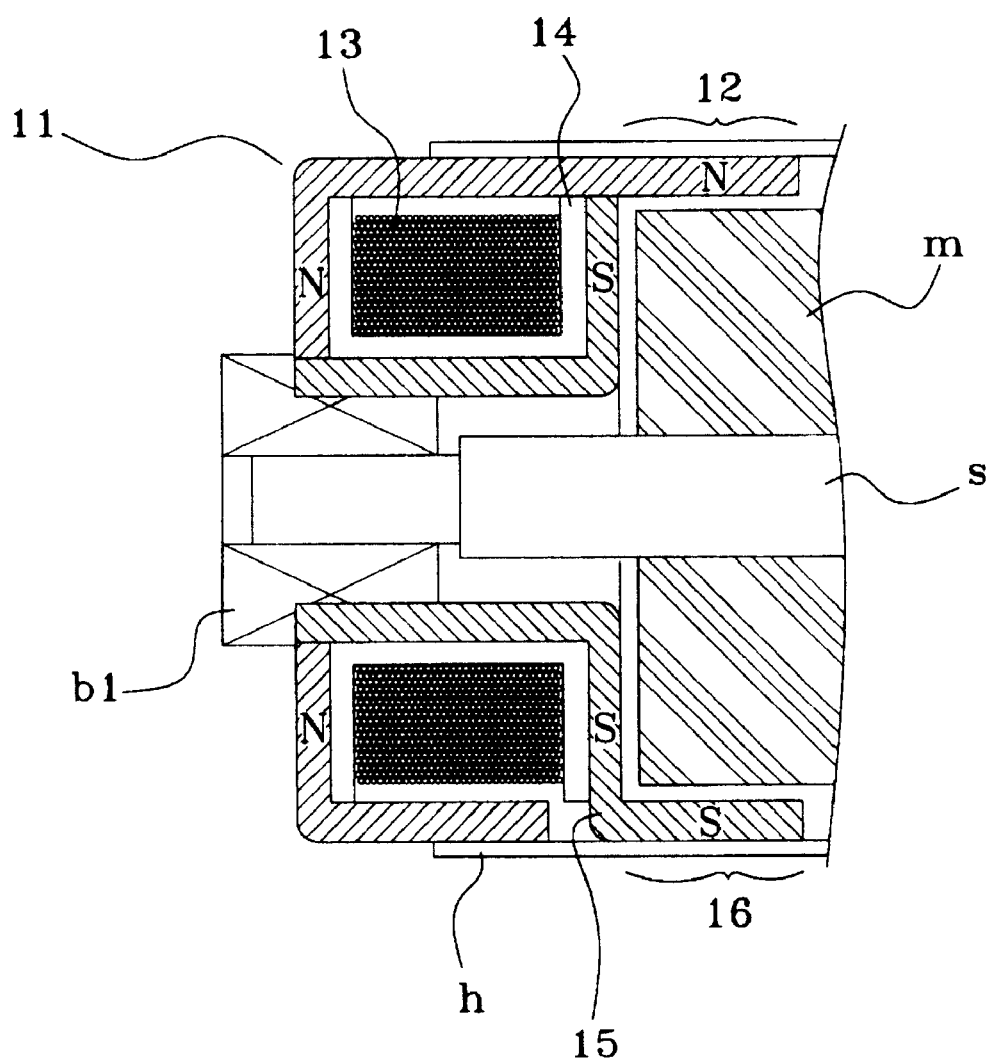
FIGS. 5 and 6 are schematic sectional views respectively showing energized states of yokes in the stepping motor of the invention.
Figure 6:
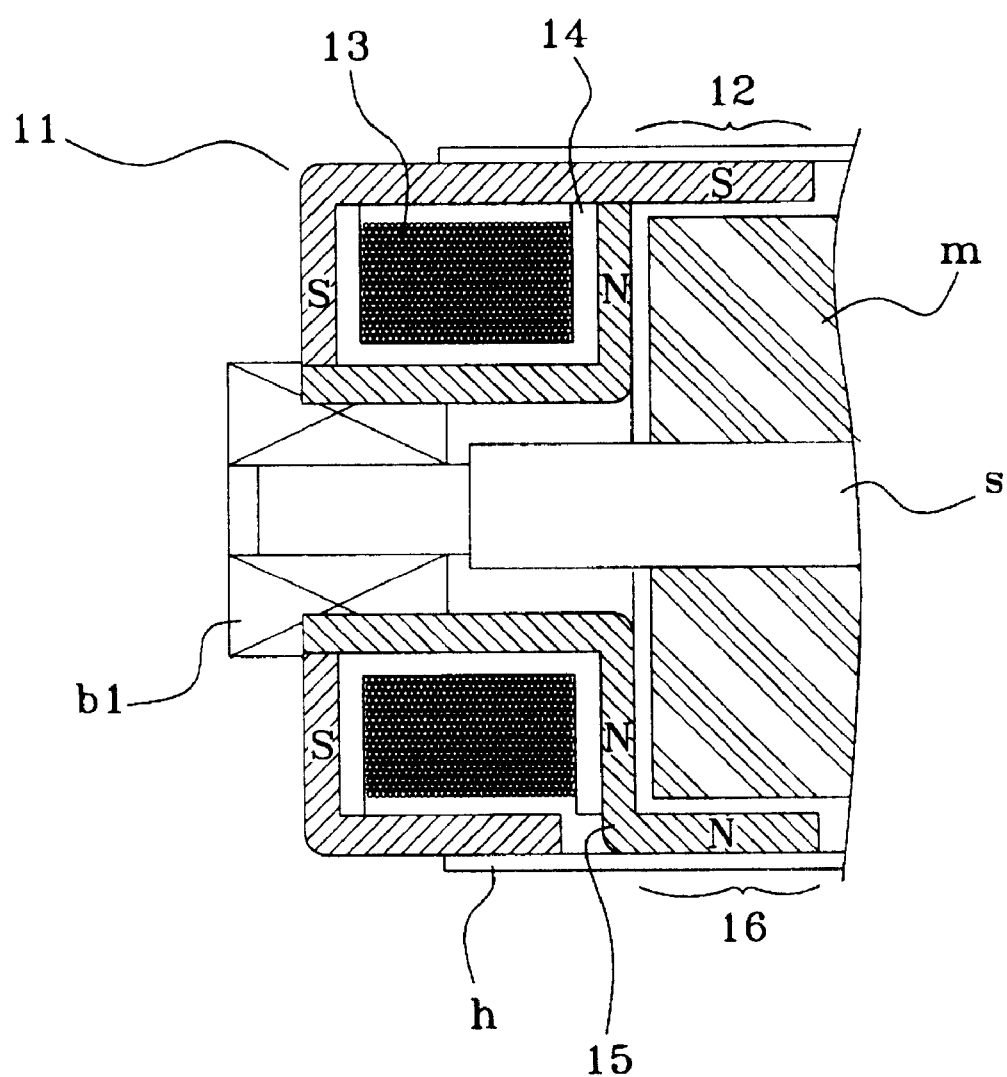

FIGS. 5 and 6 are schematic sectional views respectively showing energized states of yokes in the stepping motor of the invention. As shown in the drawings, the outer yoke 11 and the inner yoke 15 are energized into the opposite polarity with each other according to the direction of current applied to the coil 13.

In particular, when the first pole teeth 12 of the outer yoke 11 are energized into the N poles, the second pole teeth 16 of the inner yoke 15 are energized into the S poles. On the contrary, when the first pole teeth 12 of the outer yoke 11 are energized into the S poles, the second pole teeth 16 of the inner yoke 15 are energized into the N pole.

Similarly as above, as not shown, the outer yoke and the inner yoke of the second yoke are respectively energized into the opposite polarities according to the direction of current application.

Therefore, in the stepping motor configured as above, as current is applied to each of the coils 13 and 23 of the first and second yokes 10 and 20, the first and the second yokes 10 and 20 are energized. Under this condition, the first and second pole teeth 12 and 22 of the outer yoke 11 and 21 are polarized opposite to the second pole teeth 16 and 26 of the inner yoke 15 and 25. As a result, electromagnetic force is generated between the magnet m and the first pole teeth 12 and 22 and the second pole teeth 16 and 26, thereby causing the rotor constituted of the magnet m and the shaft s to rotate about the stator.

When the direction of current applied to the coils 13 and 23 are converted as set forth above, the polarities of the first pole teeth 12 and 22 of the outer yokes 11 and 21 and the second pole teeth 16 and 26 of the inner yokes 15 and 25 are changed. Then, under electromagnetic force generated between the polarities of the first and second pole teeth 12, 22, 16 and 26 and the polarities of the magnet m, the magnet m is rotated.

In other words, the magnet m functioning as the rotor is rotated for a predetermined angle in the order of energization, when energization phases are changed. While current is continuously flowing in the coil during energization, the outer yokes 11 and 21 and the inner yokes 25 and 26 show no polarity change, thereby maintaining the magnet m at a proper position.

Although the preferred embodiment of the present invention have been disclosed for illustrative purposes, the scope of the invention is not restricted to the embodiment but can be adequately varied in the category of the same spirit. For example, the shape and structure of the each component disclosed in the embodiment of the invention can be modified in implementation.

In the stepping motor of the invention having the configuration and operation as set forth above, the coils are arranged axially at both sides of the magnet while the coils are surrounded by the outer yokes and the inner yokes forming the pole teeth with the polarities different from each other, thereby reducing the entire thickness of the motor while ensuring stable output performance.

In particular, such a configuration further increases the degree of freedom in design due to downsizing of the motor.

What is claimed is:

1. A stepping motor comprising:

a rotor having a cylindrical magnet with a plurality of N-S poles radially magnetized and a shaft having one end coupled to the center of the magnet and rotationally supported by bearings;

at least one coil wound into the shape of a ring at axial sides of the magnet with air gaps; and a stator shaped as a cylinder with a shaft hole in the center for receiving the coil, the stator having an outer yoke which is arranged concentric with the magnet and has an outer circumferential edge formed with first pole teeth which are opposed to the outer circumferential face of the magnet with an air gap therefrom, and an inner yoke with one end of smaller diameter being inserted into the inner circumferential face of the coil and the other end of larger diameter covering the side of the coil and extending axially in opposed, spaced relationship to the outer circumferential face of the magnet to form second pole teeth which are alternately arranged with the first pole teeth.

2. The stepping motor in accordance with claim 1, wherein the yoke comprises first and second yokes provided at both axial sides of the magnet.

3. The stepping motor in accordance with claim 1, wherein the first and second pole teeth are energized into the polarities different from each other according to the direction of current applied to the coil.

4. The stepping motor in accordance with claim 2, wherein the pole teeth of the first yoke and the pole teeth of second yoke are extended toward each other.

5. The stepping motor in accordance with claim 2, wherein each of the first and second yokes is fixedly inserted into the inner circumferential face of a cylindrical housing.

6. The stepping motor in accordance with claim 1, wherein the first and second pole teeth have a proper air gap from each other.

7. A stepping motor comprising:

a cylindrical magnet with a plurality of N-S poles radially magnetized;

a shaft having one end coupled to the center of the magnet and rotationally supported by bearings;

a pair of coils wound into the shape of a ring at axial sides of the magnet with air gaps;

first and second yokes, the outer yoke shaped as a cylinder for receiving the coils which is arranged concentric with the magnet and has an outer circumferential edge extending axially to form first pole teeth which are opposed to the outer circumferential face of the magnet with an air gap therefrom, and an inner yoke with one end of smaller diameter being inserted into the inner circumferential face of the coil and the other end of larger diameter covering the side of the coil and extending axially to form second pole teeth which are in opposed, spaced relationship to the outer circumferential face of the magnet and alternately arranged with the first pole teeth.

8. The stepping motor in accordance with claim 7, wherein the first and second pole teeth are energized into the polarities different from each other according to the direction of current applied to the coil.

9. The stepping motor in accordance with claim 7, wherein the first and second pole teeth have a proper air gap from each other.

* * * * *